United States Patent
Yim et al.

(10) Patent No.: US 8,233,389 B2
(45) Date of Patent: Jul. 31, 2012

(54) METHOD AND PROTOCOL FOR CONGESTION CONTROL IN A VEHICULAR NETWORK

(75) Inventors: Raymond Yim, Cambridge, MA (US); Fei Ye, Seattle, WA (US); Masashi Saito, Dorchester, MA (US); Philip V. Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 96 days.

(21) Appl. No.: 12/543,944

(22) Filed: Aug. 19, 2009

(65) Prior Publication Data

US 2011/0044172 A1 Feb. 24, 2011

(51) Int. Cl.
  *H04L 12/26* (2006.01)
(52) U.S. Cl. ........................................................ 370/229
(58) Field of Classification Search .................. 370/229, 370/230, 230.1, 231–235, 252, 253, 254, 370/255, 310, 310.2
See application file for complete search history.

(56) References Cited

U.S. PATENT DOCUMENTS

| | | | |
|---|---|---|---|
| 2002/0150050 A1* | 10/2002 | Nathanson | 370/241 |
| 2004/0147223 A1* | 7/2004 | Cho | 455/41.2 |
| 2004/0215373 A1* | 10/2004 | Won et al. | 701/1 |
| 2005/0053003 A1* | 3/2005 | Cain et al. | 370/235 |
| 2005/0085963 A1* | 4/2005 | Kapolka et al. | 701/29 |
| 2008/0002573 A1* | 1/2008 | Mosko et al. | 370/229 |
| 2008/0002587 A1 | 1/2008 | Liu et al. | |
| 2009/0191573 A1* | 7/2009 | Moulin et al. | 435/7.2 |
| 2011/0006913 A1* | 1/2011 | Chen et al. | 340/902 |

FOREIGN PATENT DOCUMENTS

GB 2386793 9/2003

OTHER PUBLICATIONS

Romdhani et al., "Adaptive EDCF: enhanced service differentiation for IEEE 802.11 wireless ad-hoc networks," Wireless Communications and Networking, Mar. 20, 2003.

Yang et al., "vehicle-to-vehicle communication protocol for cooperative collision warning," Mobile and Ubiquitous Networks: Networking and Services, 2004.

Zang Y et al.: "Congestion Control in Wireless Networks for Vehicular Safety Applications" Proceedings of the 8th European Wireless Conference, Paris, France, Jul. 1, 2007; Retrieved from the Internet: URL:http://www.comnets.rwth-aachen.de/publications/gesemtlisten/abstracts/2007/zastchrepabaew2007.html>.

(Continued)

*Primary Examiner* — Kwang B Yao
*Assistant Examiner* — Juvena Loo
(74) *Attorney, Agent, or Firm* — Dirk Brinkman; Gene Vinokur (57) ABSTRACT

In a vehicle ad-hoc network (VANET), a transceiver node is arranged in a vehicle. The node includes a protocol stack, which includes an application layer, a link layer; and a congestion control layer arranged between the application layer and the link layer. The congestion layer transfers short messages between the application layer and the link layer. The short messages are defined according to a standard for the VANET, and the congestion layer optimizes a network-wide rate allocation for the short messages.

18 Claims, 10 Drawing Sheets

OTHER PUBLICATIONS

Daniel Jiang et al.: "Design of 5.9 ghz DSRC-Based Vehicular Safety Communication" IEEE Wireless Communications, IEEE Service Center, Piscataway, NJ, US, vol. 13, No. 5, Oct. 1, 2006, pp. 36-43.

Robinson C.L., Caminiti L., Caveney D., Laberteaux K.: "Efficient Coordination and Transmission of Data for Cooperative Vehicular Safety Applications" International Conference on Mobile Computing and Networking Vanet '06 Sep. 29, 2006; Retrived from the Internet: URL:http://portal.acm.org/citation.cfm?id=1161064.1161067.

Abdalla G., Abu-Rgheff M. et al. "Current Trends in Vehicular Ad Hoc Networks" 2007 XP002607740 Retrieved from the Internet: URL:http://citeseerx.ist.psu.edu/viewdoc/summary?doi=10.1.120.9706.

* cited by examiner

METHOD AND PROTOCOL FOR CONGESTION CONTROL IN A VEHICULAR NETWORK

FIELD OF THE INVENTION

This invention relates to ad-hoc mobile networks, and more particularly to congestion control, admission control and rebroadcast control of messages in vehicular mobile ad-hoc networks.

BACKGROUND OF THE INVENTION

Figure 8:
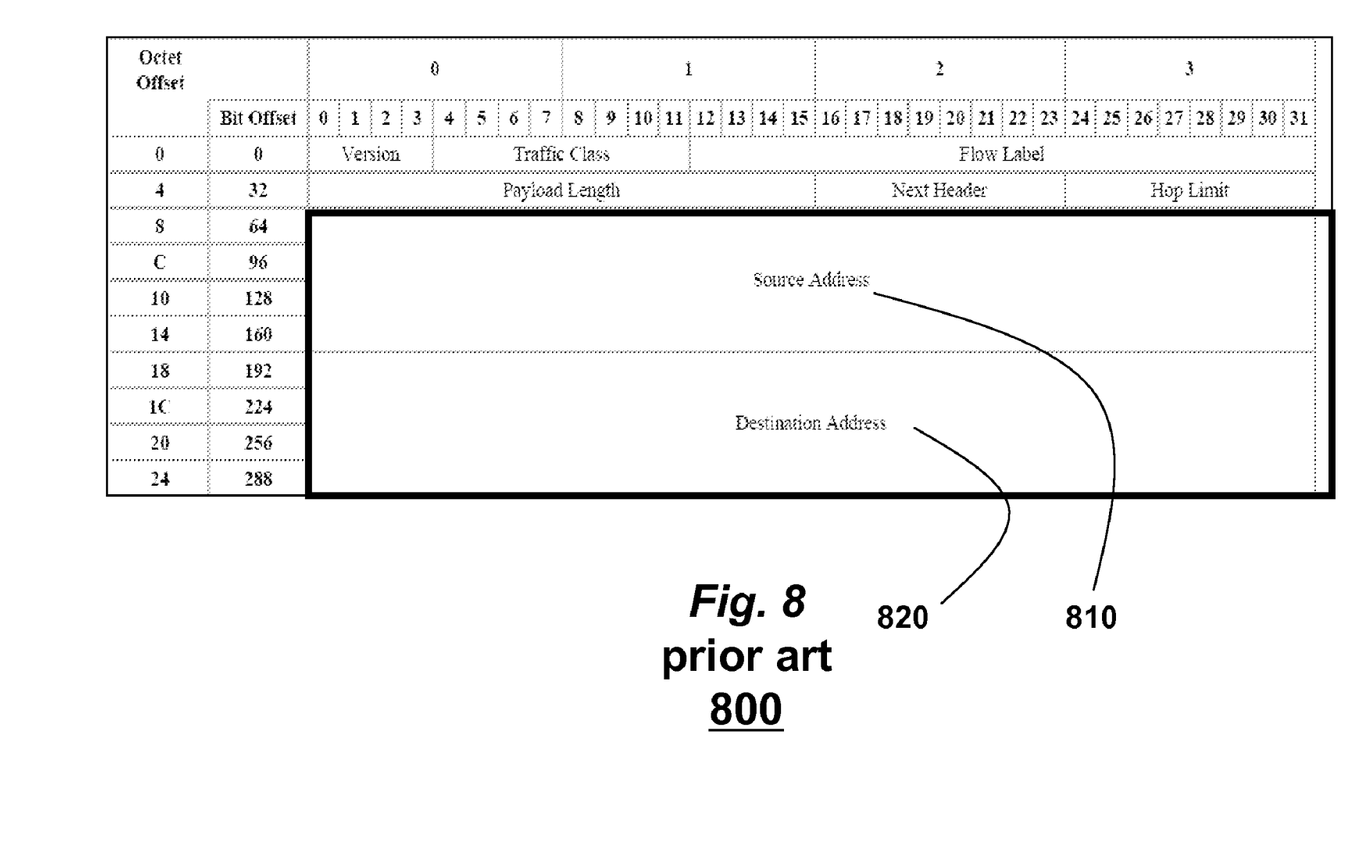
FIG. 8 is a block diagram of an Internet Protocol messages.

In a conventional wireless network of nodes that use a protocol stack, internet protocol (IP) messages 800, see FIG. 8, are transferred between an application layer, a transport control protocol (TCP) layer, a network layer, a link layer, a media access (MAC) layer and a physical (PHY) layer. Outgoing messages are transferred top to bottom, and incoming message are transferred bottom to top.

The TCP layer is responsible for end-to-end congestion control. The TCP layer relies on message acknowledgement for rate management.

The MAC layer uses carrier sense multiple access (CSMA) and random back-off to control access to the physical layer as specified by the IEEE 802.11 standard. If two or more nodes transmit messages concurrently, collisions can occur so that the messages cannot be decoded. The performance of the network, e.g., throughput, error rate, and delay, depend on the collision rate.

The nodes can be embedded in vehicles to disseminate information related to vehicular environments. The IEEE P1609 standard, which pertains to wireless access in a vehicular environment (WAVE), specifies a WAVE protocol stack.

In vehicular networks, multiple priority levels are defined. Time-sensitive short messages (SM) 900, see FIG. 9, should be reliably sent with low latency to all nearby vehicles and road-side infrastructure. As an example, the Society of Automotive Engineers (SAE) has defined a set of safety critical short messages such as crash-pending notification, and hard braking, only tolerates a latency of up to 10 milliseconds. This criterion can not be satisfied in a congested network where a large number of messages need to be communicated within a relatively short time interval.

In both unicast and broadcast networks, an Enhanced Distributed Coordination Function (EDCF) supports different access priorities to different access categories (ACs) at the MAC layer. High priority AC achieves shorter delivery latency, and higher throughput.

Message collision rate, message delivery delay, and medium utilization are described by Romdhani et al., "Adaptive EDCF: enhanced service differentiation for IEEE 802.11 wireless ad-hoc networks," Wireless Communications and Networking, 20 Mar. 2003. The collision rate and delay increases as a function of the overall load of in wireless networks.

A message rate decreasing procedure is described by Yang et al., "vehicle-to-vehicle communication protocol for cooperative collision warning," Mobile and Ubiquitous Networks: Networking and Services, 2004. That procedure controls the message rate at which alert messages are generated by each vehicle to achieve low latency in dense vehicular networks.

SUMMARY OF THE INVENTION

The embodiments of the invention provide a congestion control protocol for vehicular ad-hoc networks (VANET). The congestion control protocol extracts and stores local network information, i.e., node density and aggregate data rate, neighboring node information, number of successes and failures in reception, for incoming and outgoing messages. It also keeps track of node status. Local nodes are those within communication range.

According to the local network information, and the status, the protocol performs congestion control, admission control and rebroadcast control operations on short messages (SM), i.e., the layer temporarily stores short messages in buffers, transfers messages between layers, introduces delay, deletes messages, and changes transmission parameters.

DETAILED DESCRIPTION OF PREFERRED EMBODIMENTS

Vehicular Network

Figure 1:
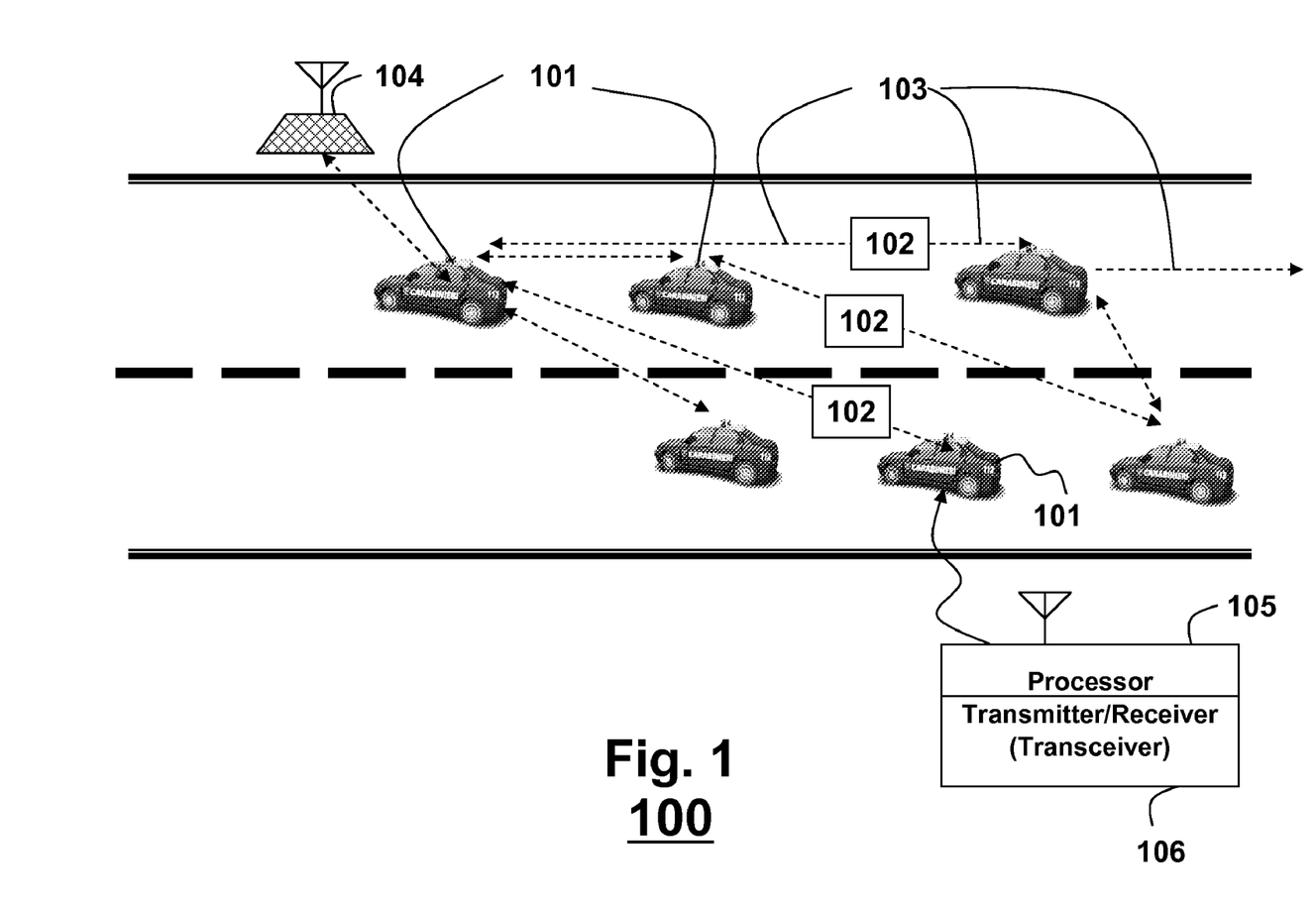
FIG. 1 is a schematic of a vehicular network according embodiments of the invention.

As shown in FIG. 1, the embodiments of our invention provide congestion control for messages 102 in a vehicular ad-hoc network (VANET) 100 of nodes 101. Each node includes a processor 105 and a transceiver 106, i.e., a transmitter and receiver. Therefore in this description, the terms node and vehicle are used interchangeably. Because the nodes are in vehicles, the network is ad-hoc and mobile as vehicles enter and leave traffic. The nodes transceive the messages 102 on channels 103. It is understood that the messages can be transmitted as one or more packets, depending on the design of the network, and length of the message. The network can also include infrastructure nodes 104 for communicating with emergency response agencies. The processor can include memories, and input/output interfaces as known in the art.

Our congestion control manages the messages 102 entering the network 100 to prevent oversubscription of the communication channels 103. Typically, the congestion control layers of the nodes achieve an optimal network-wide rate allocation. One optimal rate allocation is $$\max_x U(x),$$

where x is the rate, which can be determined by the probability of transmission, and U is a convex utility function that measures the benefit to the network. For example, U(x) can represent the total number of packets that are received by all nodes in the network for a time duration given a transmission rate x. If x is initially small, an increase in x also increases the total number of packets transmitted in the network, which in turn increases U(x). However, as x becomes larger, eventually collisions cause receive packets to be erroneous, which in turn reduces U(x).

Congestion control should not be confused with flow control, which prevents the transmitter from overwhelming the receiver.

The nodes can be designed according to the 802.11p standard to provide wireless access in vehicular environments (WAVE). The standard supports Intelligent Transportation Systems (ITS) applications, which includes data exchange between high-speed vehicles and between the vehicles and the roadside infrastructure in the licensed frequency bands. The IEEE 1609 family of standards are higher layer standards on which rely on the IEEE 802.11p standard to provide data link layer and physical layer functionality. Also related is the ASTM E2213-03 Standard Specification for Telecommunications and Information Exchange Between Roadside and Vehicle Systems, 5 GHz Band Dedicated Short Range Communications (DSRC) Medium Access Control (MAC) and Physical Layer (PHY) Specifications. Alternatively, the network can be designed according the ISO/NP 13181 standard "Intelligent Transport Systems—Communications Access for Land Mobiles (CALM).

Protocol Stack

Figure 2:
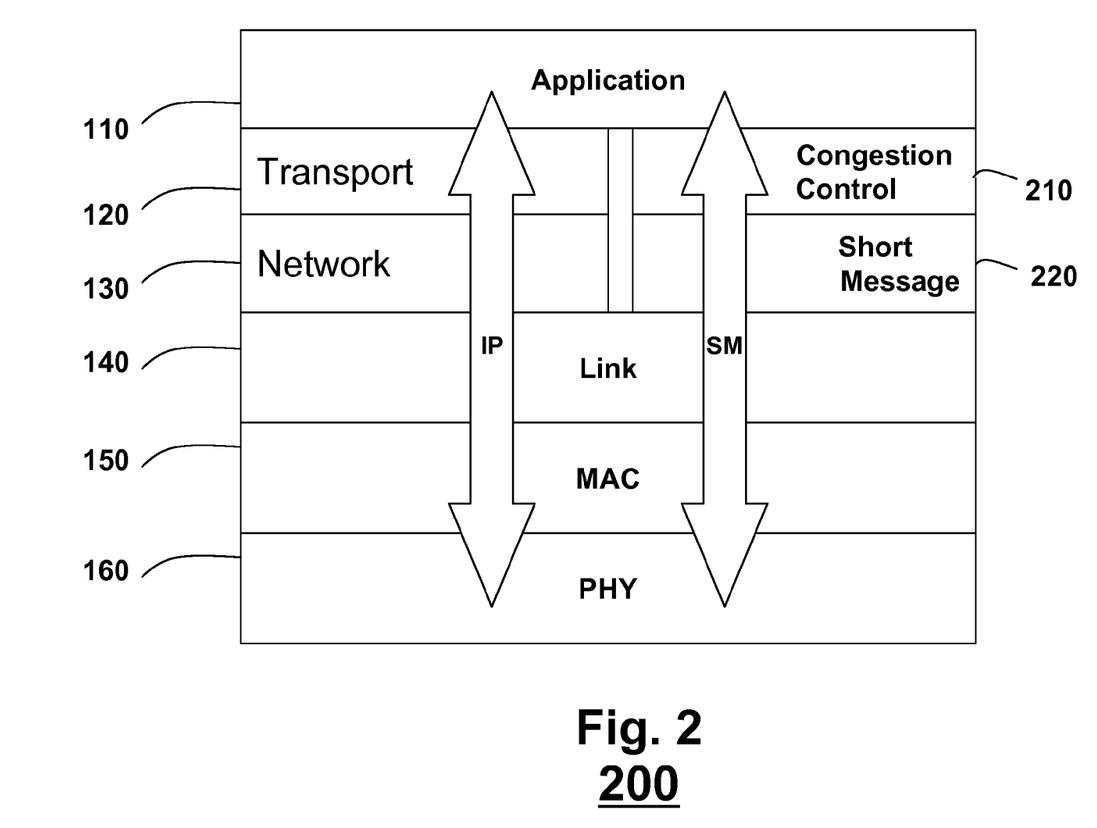
FIG. 2 is a block diagram of a protocol stack according to embodiments of the invention.

As shown in FIG. 2, each node in the network includes a protocol stack 200. The protocol, from top to bottom, includes an application layer 110, a transport layer 120, a network layer 130, a link layer 140, a medium access (MAC) layer 150, and a physical (PHY) layer 160.

In addition, the protocol stack 200 includes a congestion control layer 210, and a short message layer 220.

It is understood that the layers can be implemented in one or more processors 105 in each node for performing steps of the protocol. The congestion control layer 210 performs congestion control, admission control, and rebroadcast control for outgoing (transmitted) messages utilizing local network information and node status stored at each node as described herein.

IP and SM Messages Distinguished

Figure 9:
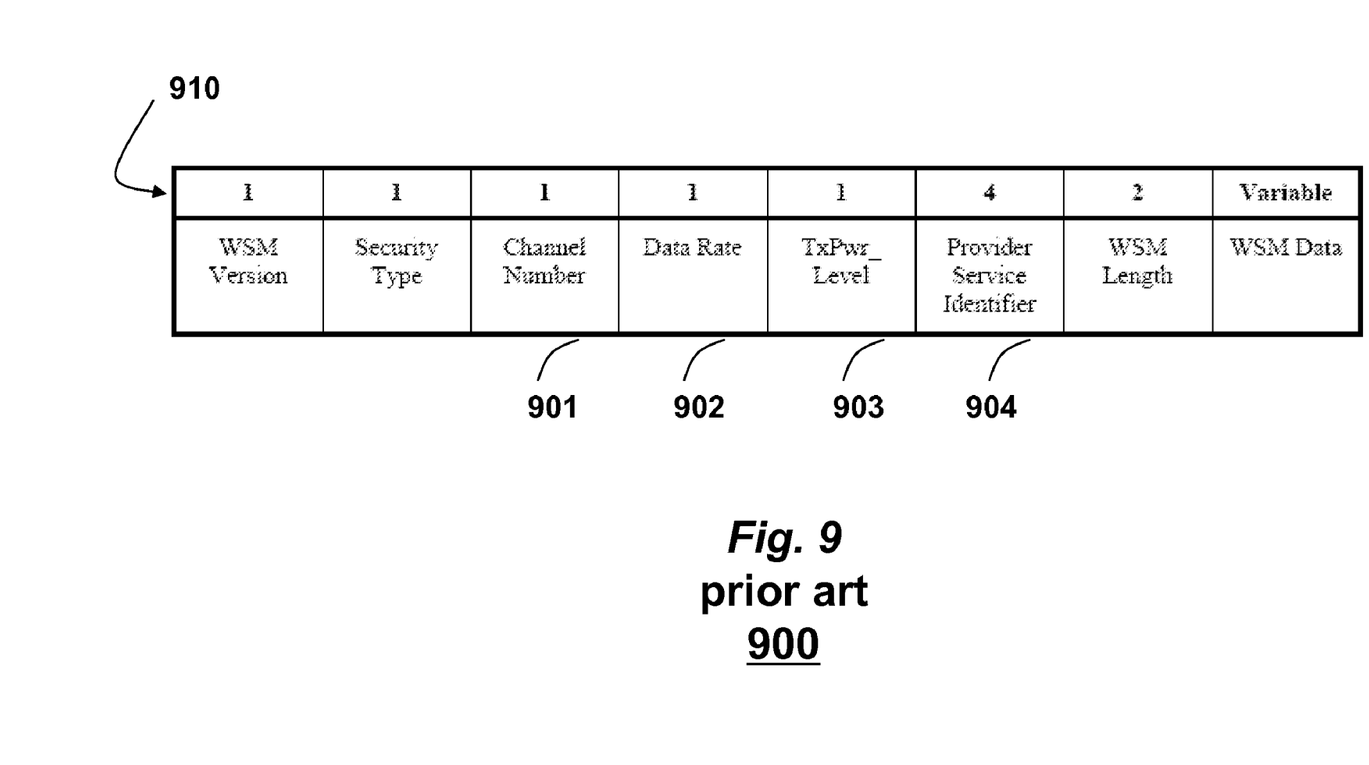
FIG. 9 is a block diagram of a Short Messages.

As shown in FIGS. 8-9, the messages 102 can include Internet Protocol (IP) messages 800 and Short Messages (SM) 900.

IP Messages

Internet Protocol version 6 (IPv6) is the successor to IPv4 to provide for a larger number of addresses. IPv6 was defined in December 1998 by the Internet Engineering Task Force (IETF) with the publication of an Internet standard specification, RFC 2460. IP messages use a best effort delivery protocol, which does not guarantee delivery. IP messages are unicast or multicast, and therefore include a source address 810 and a destination address 820. Note that the IP messages do not specify any parameters for the physical layer.

SM Messages

WAVE devices support generic IPv6 traffic, as well as the specialized short messages. It is understood that the term "short" is not meant to be indefinite. To the contrary, short messages specifically refer to a type of message unambiguously defined in VANET related standards, e.g., see IEEE 1609.3, 2007, and consistently referred therein as short messages, and nothing else.

"3.1.29 WAVE short message protocol (WSMP): A protocol for rapid, reliable exchange of messages in a rapidly-varying RF environment where low-latency is also an important objective."

As described herein, the WSMP is implemented using the short message layer. The short message layer enable the node to directly control physical layer characteristics, e.g., channel number and transmitter power for short messages, and are designed to consume minimal channel capacity.

"4.2.2 Communication protocols: WAVE accommodates two protocol stacks: standard Internet Protocol (IPv6) and the unique WAVE short message protocol (WSMP) designed for optimized operation in the WAVE environment."

As shown in FIG. 9, the field lengths 910 are in bytes. Short messages 900 are broadcast instead of unicast as IP messages, and therefore are do not include address information. Short messages, unlike IP messages, are time critical and are expected to meet delivery guarantees. In addition, the short messages specify physical layer parameters, and therefore include a channel number 901, data rate 902, transmit power level 903, and provider service identifier 904. None of these fields are present in the IP message 800.

Outgoing messages to be transmitted by the node on a channel are transferred from the application layer to the PHY layer. Incoming messages received by the node on the channel are transferred from the PHY layer to the application layer.

Short message pass through the congestion control layer 210 and the short message layer short message layer 220 instead of the transport layer 120 and network layer 130 as IP messages. Short messages are broadcast, instead of unicast or multicast as IP messages.

Since multicast and broadcast are often confused, the following definitions are provided.

Unicast

Unicast messages are transmitted point to point. There is one transmitter, and one receiver specified by an address.

Multicast

Multicast messages are transmitted from one or more points to a set of other specified points as specified by multiple individual addresses or a single group address.

Broadcast

Broadcast messages are transmitted from one point to any receiver in range. No addresses are specified.

One type of message in vehicular networks is a heartbeat message. This message contains information such as vehicle location, velocity, acceleration, and braking condition. Heartbeat message are broadcast by all the vehicles every 100 ms, with a guaranteed latency of less than 10 ms.

Due to the broadcast nature of short messages, short message in vehicular networks do not use acknowledgements, in contrast with other conventional message. That is, receivers of the broadcast short message do not acknowledge the short messages. There is nothing inherently ambiguous or uncertain about our not acknowledging. As used herein, the lack of acknowledgement decreases network traffic, and makes the boundaries of the scope definitely, albeit negatively.

Hence, the conventional TCP layer used for IP messages cannot be used for congestion control in vehicular networks that do not provide for message acknowledgements, and where messages are broadcast.

Congestion Control Layer

Figure 3:
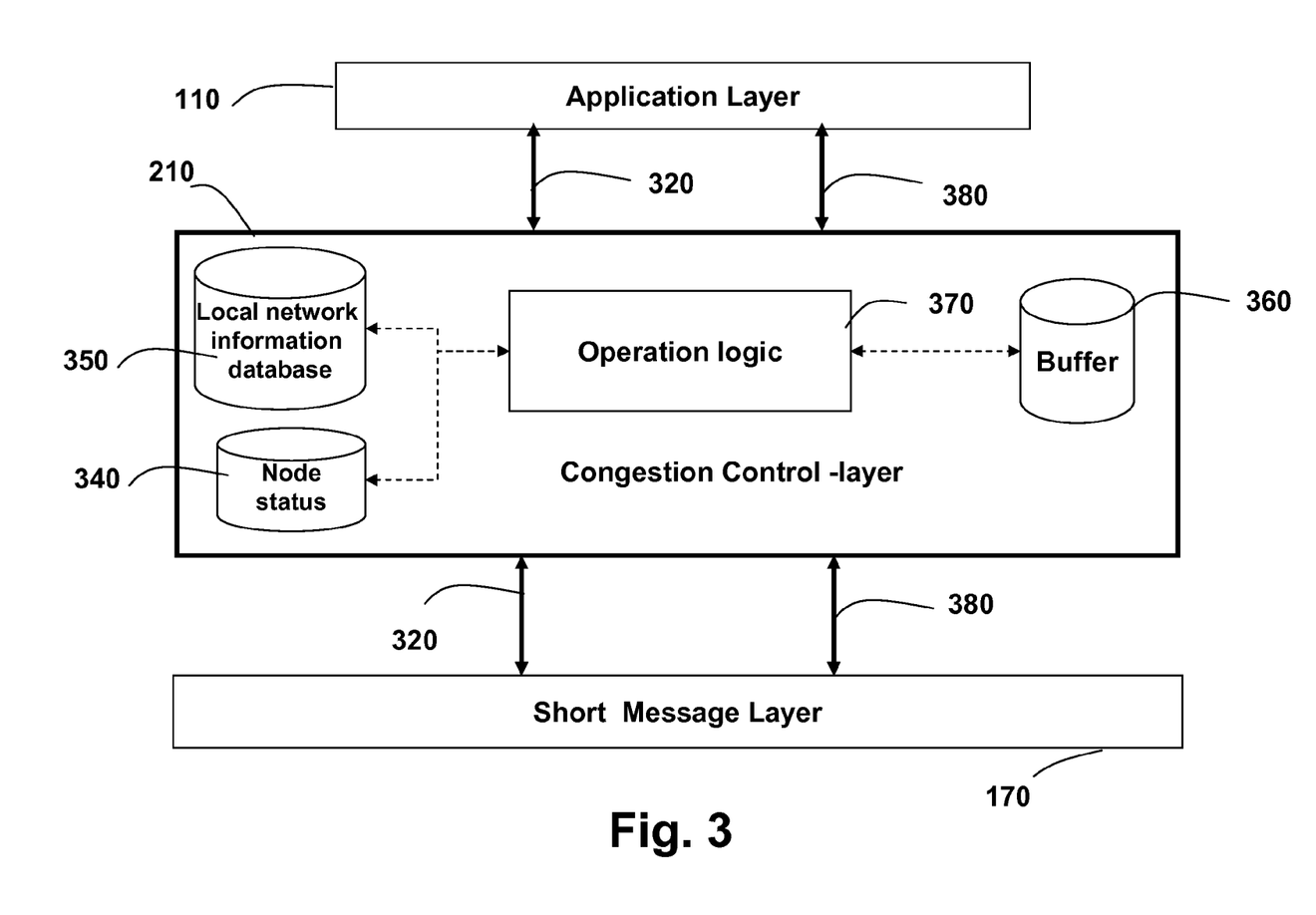
FIG. 3 is a block diagram of operations at the congestion control layer according to embodiments of the invention.

FIG. 3 shows the details of our congestion control layer 210. The layer 210 can include a processor for performing steps of the congestion control method. The layer can also include memories, e.g., a database, cache and buffer. Data interfaces 380 and control interfaces 380 connect the congestion control layer to the application layer 110 and the short message layer 220. The congestion control layer 210 stores a node status 340, and maintains a local network information database 350. A buffer 360 can be used to store incoming and outgoing short messages. If the implementation does not include the buffer, message can simple be deleted (dropped) instead of transferred during network congestion.

Operation logic 370 distinguishes high priority messages and messages associated with special applications, extract information from incoming and outgoing messages to update the node status and local network information database, and process the messages based on the node status and the local network information before transferring the messages between the layers.

Local Network Information Database

The local network information database 350 stores local network information, such as the number of successes and failures in message reception in a predetermined time interval, the most recent node location and statuses of neighboring nodes, and estimated densities of the nodes and aggregate data rates. The stored information expires if it is not updated within some predetermined interval.

Buffer

The buffer 360 is maintained by the congestion control layer to store messages as required by the operation logic 370. Each message is stored in the buffer for a predetermined time interval, and is deleted by the operation logic if the buffering delay exceeds a predetermine time interval. The operation logic 370 also provides buffer management, such as overflow and priority management. For example, the operation logic deletes messages when the buffer overflows; and the logic can process higher priority messages first.

Update Message

Figure 4:
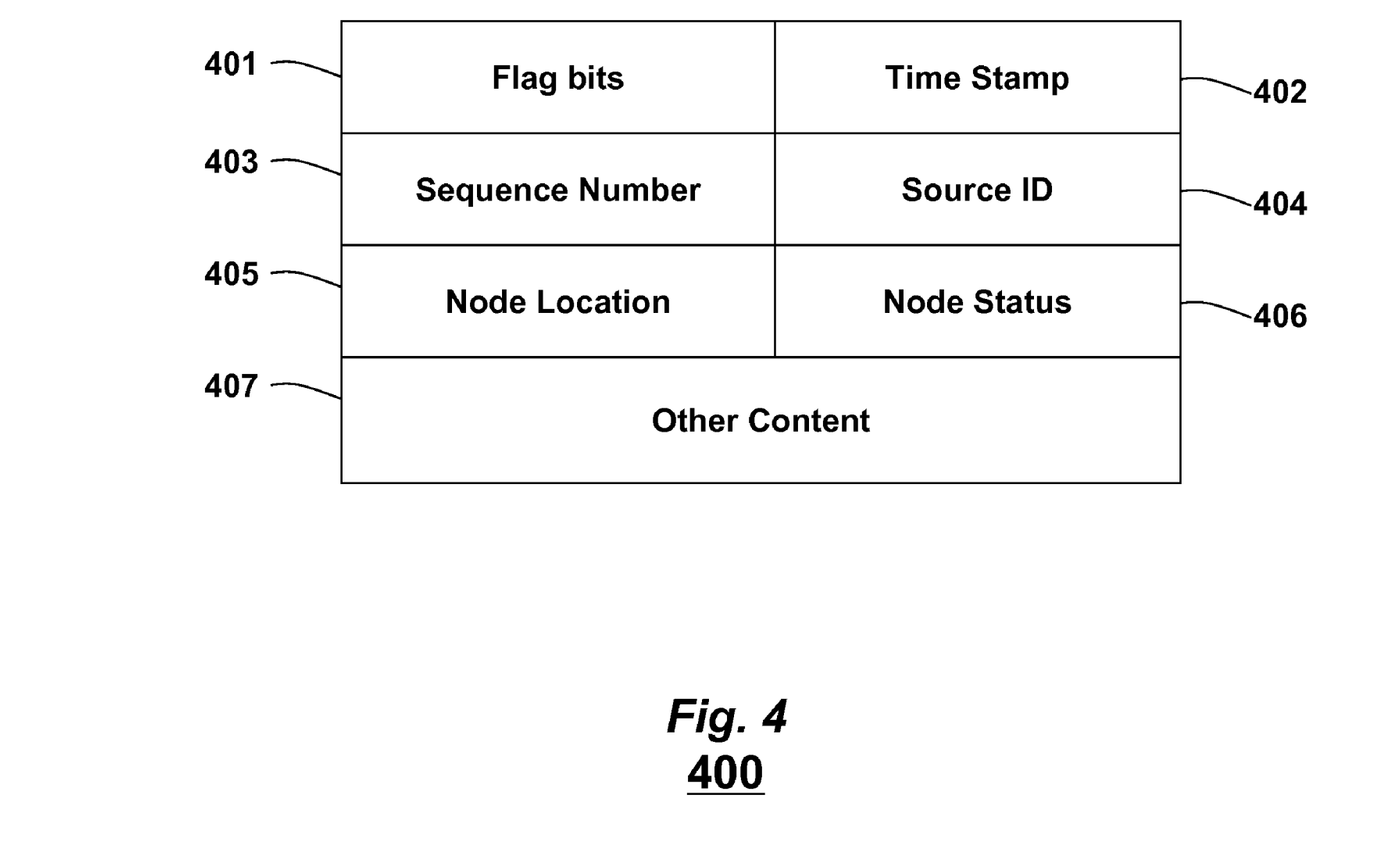
FIG. 4 is a block diagram of a periodic update message according to embodiments of the invention.

As shown in FIG. 4, each node periodically broadcast updates on its status, location and other information 407 using the message 400. The content of an update message includes flag bits 401, a time stamp 402, a sequence number 403, a source ID 404, a node location 405, a node status 406, and other content 407, such a location, velocity, acceleration and braking condition. The source ID should not be confused with a conventional IP address, such as 2001:db8:0:1234:0:567:1:1 for IPv6.

The application layer that generates the message can acquire the node status from its own record, or from the congestion control layer via the control interfaces. The update information can also be embedded in the IEEE 802.11 beacon message, or the heartbeat message defined by the SAE.

Alert Message

Figure 5:
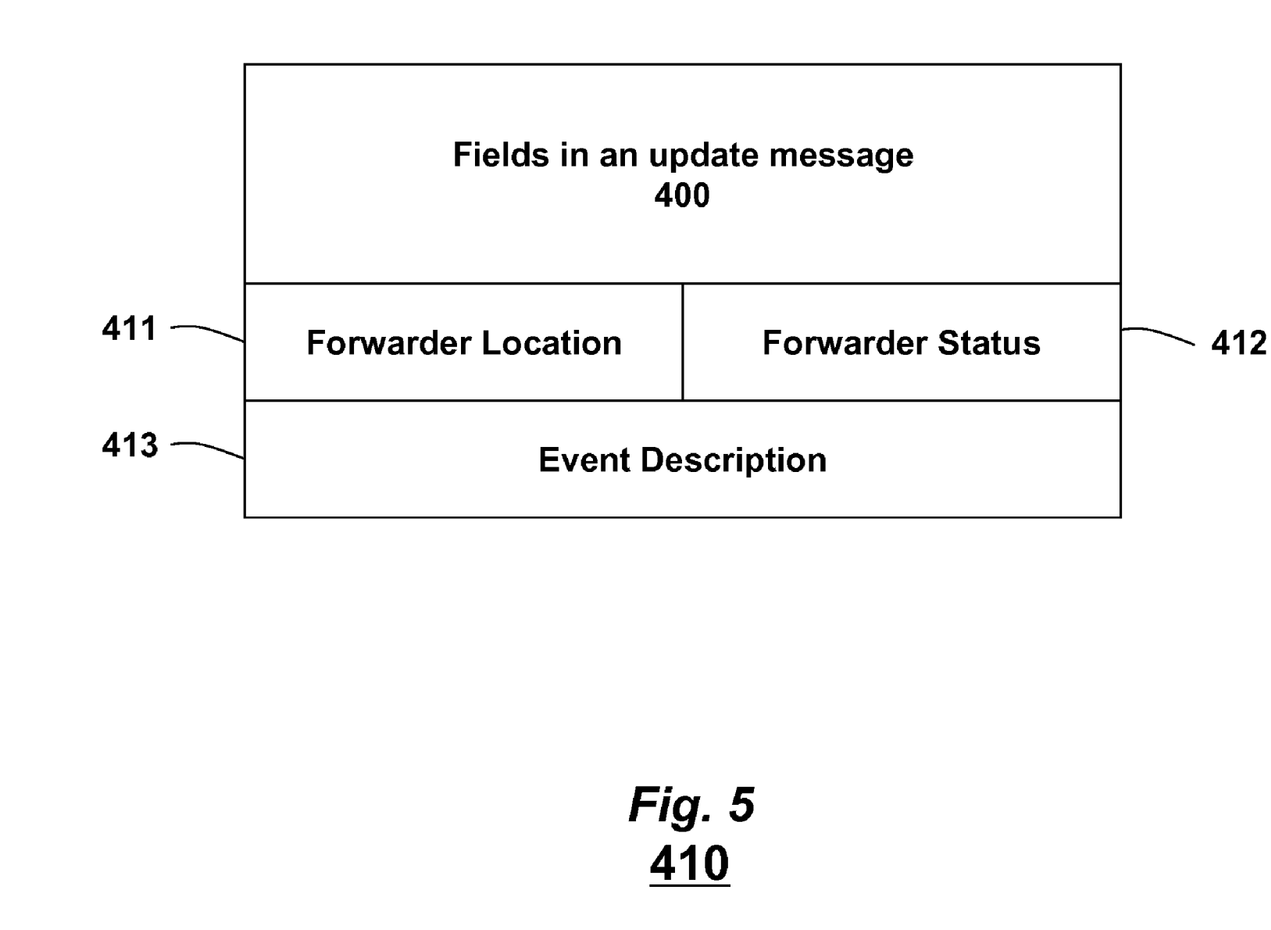
FIG. 5 is a block diagram of an alert message according to embodiments of the invention.

FIG. 5 shows an alert message 410 when the node detects an unusual event. The alert message includes all the fields in an update message 400, and a forwarder location 411, a forwarder status 412, and an event description 413. The forwarder location and forwarder status are extended when the alert message is rebroadcast by another node. In both the update and alert messages, the flag bits are used to identify the messages. The source ID and sequence number uniquely identify the message. Periodic update messages and alert messages are control messages.

Operation on Incoming Messages

Figure 6A:
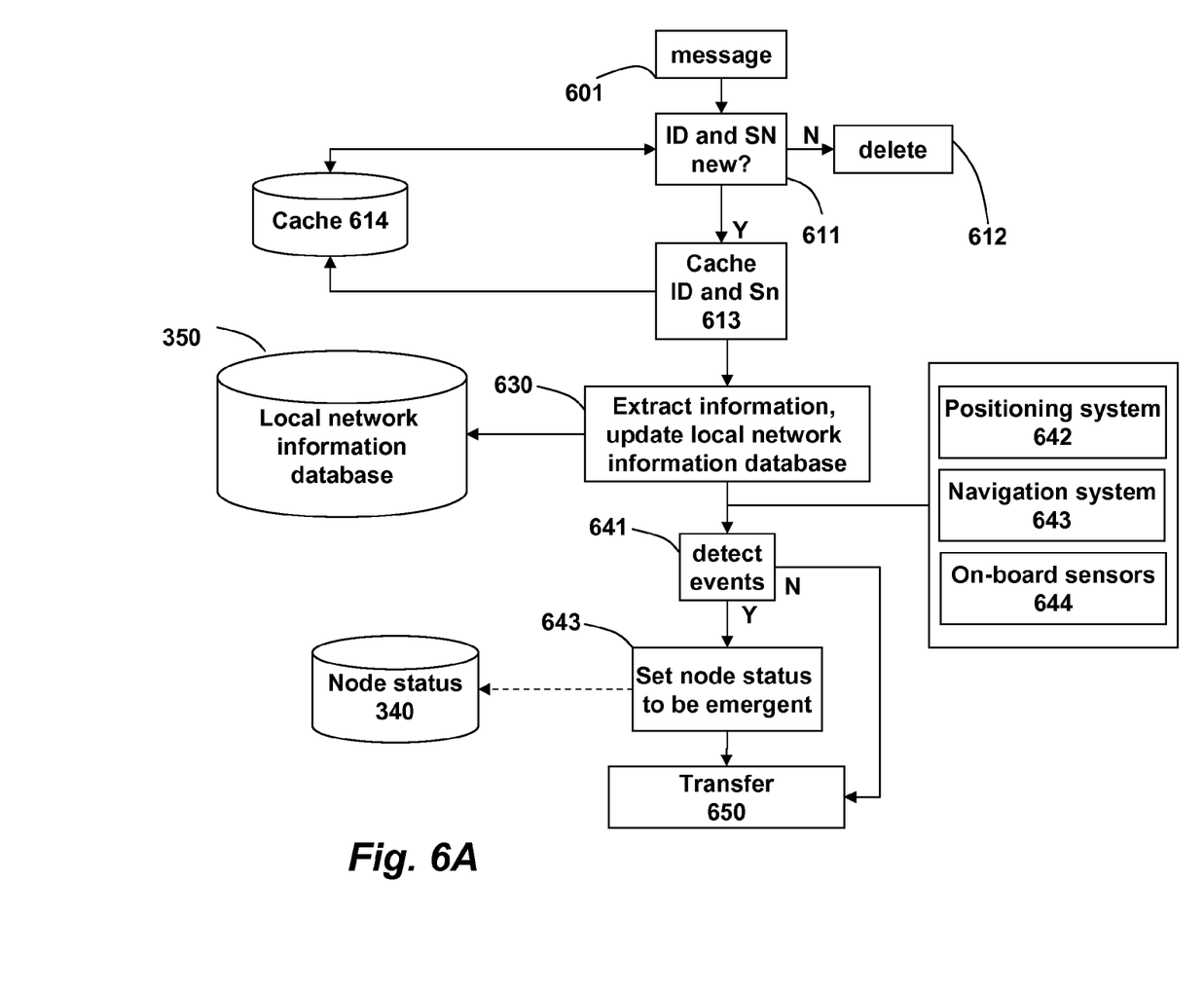
FIG. 6A is a flow diagram of processing an incoming message according to embodiments of the invention.

FIG. 6A shows the process for transferring an incoming message 601 by the congestion control layer. The operation logic first determines 611 if the message is a duplicate based on the source ID and sequence number (SN) using the cache 614. If this is a duplicated message, then the message is deleted 612. Otherwise, the operation logic caches 613 the source ID and SN, and extracts information to update 630 the local network information database 350. The updated information includes location, speed, direction, status, and local density of neighboring vehicles that transmitted the message at a particular data rate. Then, the operation logic detects 641 unusual events according to the message content, and perhaps, information from a positioning system 642, a navigation system 643, and on-board sensors 644. If such events are detected, the operation logic sets 643 the node status 340 to emergency 520, and transfers 650 the incoming message to the application layer.

The congestion control layer can also periodically inquire the number of successes and failures in reception and idle time using the control interfaces 380.

When the congestion control layer makes an inquiry to the MAC layer, the MAC layer sets the numbers of successes, failures, and idles to zero. It is also possible to use other methods, such as checking the timestamp in a message reception log to implement this function.

Figure 6B:
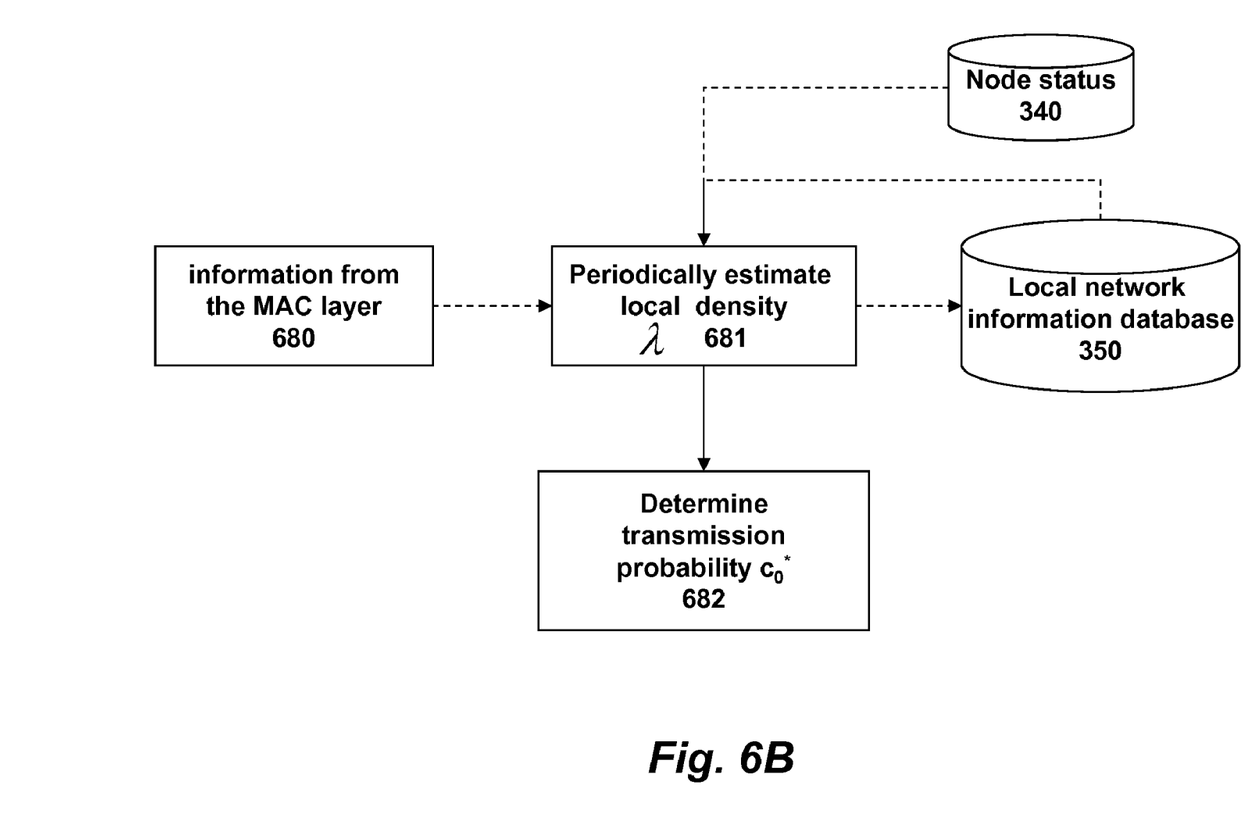
FIG. 6B is a flow diagram of a density estimation according to embodiments of the invention.

FIG. 6B shows the processing of the information 680 received from the MAC layer, and other information used to periodically estimate 681 the local node density λ. The additional information used in density estimation can includes node status, and previous local density. There are several ways to estimate local node density.

Parametric

If the number of successes in reception is $S_n$, the number of failure in reception is $F_n$, the current time is $T_c$, and the last estimation time is $T_o$, then the density is $$\lambda = \frac{C}{1 - \left(\frac{S_n + wF_n}{T_c - T_0}\right)},$$

where, C and w are constant values determined by the network.

Probabilistic

If the probability of idle time is $P_I$ and the probability of failed receptions is $P_F$, then the density is $$\lambda = \Gamma(P_F + P_I, c_0),$$

where $c_0$ is the probability that a particular vehicle transmits its message. The function $\Gamma(.)$ depends on transmission power, network bandwidth, noise, path loss and signal modulation scheme.

Actual

The density can also be determined by monitoring all messages. In this case, MAC layer returns the actual number of neighboring vehicles.

When the density is updated, the congestion control logic determines 682 the transmission probability $c_0^*$, which satisfies $$e^{\lambda \mu c_0^* + \lambda \mu} c_0^* - \lambda \mu - 1 = 0,$$

where μ is a constant that depends on transmission power, network bandwidth, receiver noise and path loss. The probability $c_0^*$ is used to perform the congestion control of outgoing messages. The probability $c_0^*$ relates to the optimal transmission rate.

Operation on Outgoing Messages

The congestion control layer processes all outgoing messages generated by the application layer, extracts information to update the local network information and node status, and then processes the outgoing messages based on node status and local network information before transferring the message to the short message layer.

The operations include, alone or in combination: caching messages; determining message rates; introducing delay; and deleting a message. Operations in the congestion control layer can be transparent to the application layer so that conventional applications can operate with the invention.

Admission Control

If the status of the node is emergency, then lower priority messages and some high priority messages that are not directly related to current status are stored in the buffer until the status returns to normal. For example, the node can store information related to traffic conditions and location. By delaying other messages, the delay for channel access for alert messages can be reduced.

Redundancy Reduction

If a node needs to rebroadcast a message and the density is greater than a predetermined threshold, then the operation logic delays the message, or deletes the message with some probability as a function of the density.

Congestion Control

The WAVE standard defines four accesses (ACs) of services with different priorities as shown in Table I.

TABLE I

EXAMPLES OF SAFETY MESSAGE PRIORITIES

| Priority | Type | Examples |
| --- | --- | --- |
| Pri(1) | Accident | Air bag sensor |
|  |  | Vehicle's body sensor |
| Pri(2) | Possibility | Thermal sensor |
|  | of Accident | Hard break |
| Pri(3) | Warning | Surface condition |
|  |  | Road work warning |
| Pri(4) | General | Traffic congestion |
|  |  | Weather condition |

The priorities have corresponding medium access parameters, e.g., minimum contention window size, maximum contention window size, arbitration inter-frame space number (AIFSN), and transmission opportunity.

Figure 7:
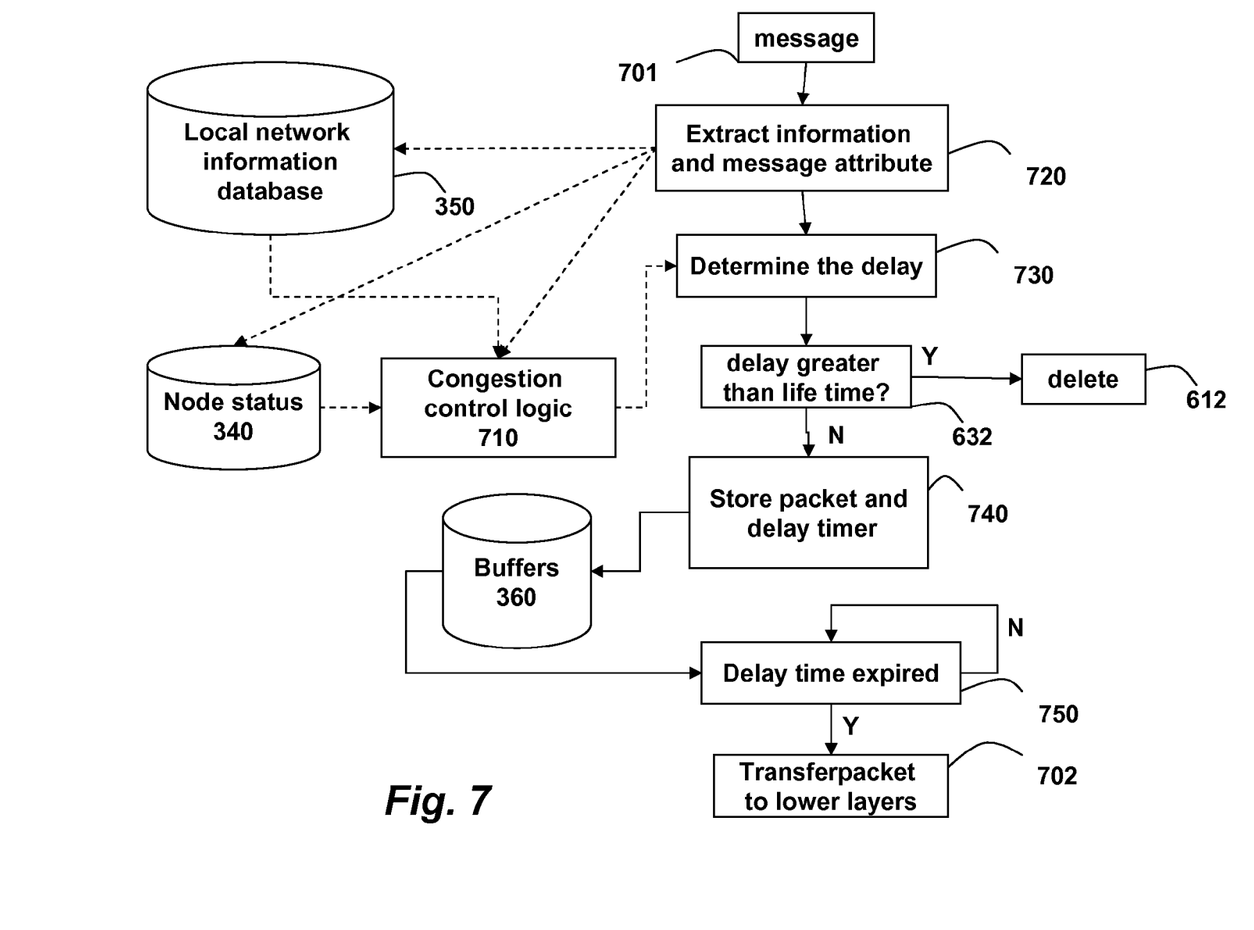
FIG. 7 is a flow diagram of processing outgoing messages according to embodiments of the invention.

FIG. 7A shows the processing for transferring an outgoing message 701. The process extracts 720 information to update the local network information database 350 and node status 340, and message attributes. A delay is determined 730 for this message. The delay is a non-decreasing function of the local density λ. If priority differentiation is required, the delay for messages with higher priority is less. If 732 the delay is more than the message lifetime, the message is deleted 733. Otherwise, the message is stored in the buffer 360 and associated 740 with a delay timer. As an independent process that is not affected by outgoing messages, the congestion control logic transfers 702 messages, whose associated timer expires 750 to the short message layer.

The transfer is based on the message attributes, node status, information in local network information database, the calculated optimal message transmission probability $c_0^*$, and indication signals from the MAC layer. If an indication signal is available from the MAC layer, after a message transmission signal is received from the MAC layer, the congestion control logic decides whether store the message in the buffer, with probability p, whenever the MAC layer senses that the channel is available. The probability p is $$p = \begin{cases} \frac{2c_0^*}{2 - c_0^*(cw-1)} & \text{if } c_0^* \in \left[0, \frac{2}{cw+1}\right) \\ 1 & \text{if } c_0^* \in \left[\frac{2}{cw+1}, 1\right], \end{cases}$$

where cw, which is greater or equal than 1, is a contention window size in the MAC layer. After the message is read from the buffer, the congestion control logic waits for another message transmission signal from the MAC before repeating the procedure. If an indication signal is not available, then the congestion control logic indicates to transmit the message according to some rate, which is a function of $c_0^*$. If the congestion control logic decides to transfer the message, the message is read from the buffer, and transferred to lower layers. If the lifetime expires before the message is transferred, then the message is deleted.

The nodes continually determine the transmission probability, $c_0^*$, and use this value to determine the rate that messages are transmitted. The probability $c_0^*$ ensures that the number of transmitting packets in the network is sufficiently low, so that in the event of an emergency, rapid channel access is insured when an unusual event is detected.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A node, in a vehicle ad-hoc network (VANET), wherein the node is arranged in a vehicle, wherein the node includes a transmitter, a receiver and a processor for performing steps of a protocol stack, comprising:
    a protocol stack, further comprising:
        an application layer;
        a link layer; and
        a congestion control layer arranged between-the application layer and the link layer, wherein the congestion layer is configured to transfer short messages between the application layer and the link layer, and wherein the short messages are defined according to a standard for the VANET, and wherein the congestion layer optimizes a network-wide rate allocation for the short messages, wherein the congestion control layer determines a transmission probability of a short message as a function of a local density, and wherein the local density depends on a number of neighboring vehicles, and data rates used by the neighboring vehicles, and wherein the transmission probability is
        $e^{\lambda\mu c_0^* + \lambda\mu} c_0^* - \lambda\mu - 1 = 0$, where μ is a constant that depends on transmission power, λ is the local density.

2. The node of claim 1, wherein the short messages are broadcast.

3. The node of claim 1, wherein the protocol stack further comprises:
    a physical layer; and
    a short message layer arranged between the congestion control layer and the physical layer, wherein the short message layer enable the node to directly control characteristics of the physical layer for the short messages.

4. The node of claim 3, wherein the characteristics include channel number, data rate, transmit power level, and provider service identifier.

5. The node of claim 2, wherein receivers of the broadcast short message do not acknowledge the short messages.

6. The node of claim 1, wherein the short message includes location, velocity, acceleration, and braking condition of the vehicle.

7. The node of claim 1, wherein the congestion control further comprises:
    means for storing a status of the node;
    a local network information database; and
    a buffer configured to store the short messages.

8. The node of claim 7, wherein messages are deleted from the buffer after a predetermined time interval.

9. The node of claim 1, wherein the short message is an update message.

10. The node of claim 1, wherein the short message is an alert message.

11. The node of claim 1, wherein duplicate incoming short messages are deleted.

12. The node of claim 7, wherein the short messages are stored in the buffer when an outgoing message rate is higher than an optimal rate.

13. The node of claim 12, wherein the short messages in the buffer are transferred to the short message layer according to the optimal rate and a priority of the short messages.

14. The node of claim 1 wherein the local density is determined by incoming and outgoing short messages, a probability of idle, successful, and failed reception of the short messages at the node.

15. The node of claim 1, wherein a number of idle, successful and failed packet reception is sent from the link layer to the congestion control layer.

16. A method for transmitting a short message by a node in a vehicle ad-hoc network (VANET), wherein the node is arranged in a vehicle, wherein the node includes a transmitter, a receiver and a processor for performing steps of the method, comprising the steps of:
  determining a local density based on a number of neighboring vehicles, and data rates used by the neighboring vehicles;
  determining a transmission probability of the short message as a function of a local density $$e^{\lambda \mu c_0^* + \lambda \mu} c_0^* - \lambda \mu - 1 = 0,$$

where $\mu$ is a constant that depends on transmission power, $\lambda$ is the local density; and
  transmitting the short message if the transmission probability is above a predetermined threshold.

17. The method of claim 16, further comprising:
  determining a probability p of storing the short message in a buffer according to $$p = \begin{cases} \dfrac{2c_0^*}{2 - c_0^*(cw-1)} & \text{if } c_0^* \in \left[0, \dfrac{2}{cw+1}\right) \\ 1 & \text{if } c_0^* \in \left[\dfrac{2}{cw+1}, 1\right] \end{cases},$$

where cw is a contention window size in a MAC layer, $c_0^*$ is the transmission probability.

18. The method of claim 16, further comprising:
  determining the local density based on incoming and outgoing short messages, a probability of idle, successful, and failed reception of the short messages at the node.

* * * * *